US010026266B1

(12) United States Patent
Shahak

(10) Patent No.: US 10,026,266 B1
(45) Date of Patent: Jul. 17, 2018

(54) ONLINE OPEN PROGRESSIVE JACKPOT CONTESTS

(71) Applicant: Playtika Ltd., Tel Aviv (IL)

(72) Inventor: Uri Shahak, Tel Aviv (IL)

(73) Assignee: Playtika Ltd., Herzliya Pituach (IL)

( * ) Notice: Subject to any disclaimer, the term of this patent is extended or adjusted under 35 U.S.C. 154(b) by 438 days.

(21) Appl. No.: 14/086,830

(22) Filed: Nov. 21, 2013

(51) Int. Cl.
*A63F 13/00* (2014.01)
*G07F 17/32* (2006.01)

(52) U.S. Cl.
CPC ................................ *G07F 17/3258* (2013.01)

(58) Field of Classification Search
CPC ......................... G07F 17/3244; G07F 17/3258
See application file for complete search history.

(56) References Cited

U.S. PATENT DOCUMENTS

2002/0039923 A1* 4/2002 Cannon .................. G07F 17/32 463/42
2006/0211479 A1* 9/2006 Walker et al. .................. 463/16
2009/0042643 A1* 2/2009 Gagner ............... G07F 17/3258 463/27
2012/0083331 A1* 4/2012 Carpenter et al. .............. 463/25
2012/0264495 A1* 10/2012 Amaitis .............. G07F 17/3267 463/10
2013/0244771 A1* 9/2013 Hafezi .................... A63F 13/12 463/29
2015/0011306 A1* 1/2015 Soong ................. G07F 17/3258 463/27
2015/0038221 A1* 2/2015 Brandstetter ....... G07F 17/3258 463/27

* cited by examiner

*Primary Examiner* — Tramar Harper
*Assistant Examiner* — Jeffrey Wong
(74) *Attorney, Agent, or Firm* — Fish & Richardson P.C.

(57) ABSTRACT

Progressive jackpot contests are operated in conjunction with games in an online system. In a contest, players compete for a jackpot funded independently from an account separate from the account paying out player winnings. The jackpot grows based on players' winnings in the games. Players of games qualify to enter contests based on their winnings in the games relative to eligibility criteria, Players of games increase their chances of winning a contests' jackpot by playing and winning in the games. As a result, contests provide an incentive for players to play game, and provide players an opportunity to win additional rewards beyond their individual game play payouts.

16 Claims, 6 Drawing Sheets

ONLINE OPEN PROGRESSIVE JACKPOT CONTESTS

BACKGROUND OF THE INVENTION

Field of the Invention

The field of technology relates to progressive jackpot contests associated with online games.

Description of Background Art

Online casino games, such as video slots, poker, roulette, and blackjack, offer players an opportunity to play games without physically visiting a casino. Users can place bets with virtual coins and, depending on game outcomes, win prizes such as additional virtual coins that can be used for betting in future rounds of the games. Users often play online games with no physical company, and many online games have no mechanism for interaction between players. Further, many online games are unconnected, in that each round of a game is independent and serves only to affect the user's quantity of virtual credits. As a result, users have limited incentives to continue playing games over a large period of time. Accordingly, users may place smaller bets in the games, or may play infrequently.

SUMMARY OF THE INVENTION

Methods and systems for operating contests associated with one or more games in an online system enable players to qualify for and compete within a contest by playing games associated with the contest. Players compete for at least part of a jackpot that is funded independently of the players' winnings. As a result, contests provide players of the games with an additional reward for play beyond their winnings in the games. The additional reward may encourage players to spend more time playing the games and place higher bets to improve their chances of winning the jackpot.

In one embodiment, one or more games are associated with a contest. Players of the associated games may become eligible to become contestants in the contest when their play fulfills an eligibility criterion. After becoming eligible, contestants may be ranked based on their continued play of the associated games. For example, contestants may be ranked based on their winnings in the associated games or the amount of time they spend playing the games. A jackpot for the contest is funded based on amounts of winnings of the contestants in the games associated with the contest. At a preselected time, number of rounds of game play, accumulated winnings, or other ending conditions, the jackpot is awarded to one or more of the contestants based on the ranking.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE EMBODIMENTS

Figure 1:
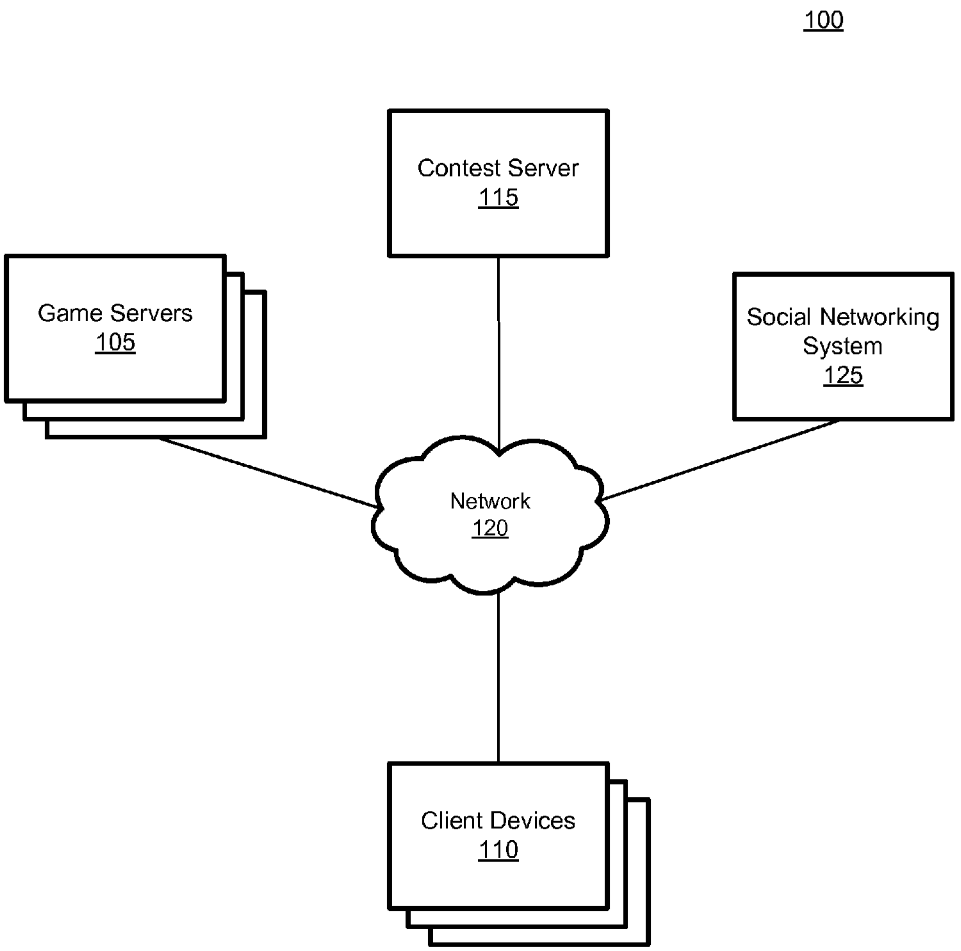
FIG. 1 illustrates an environment for conducting an online progressive jackpot contest, according to one embodiment.

FIG. 1 illustrates an environment 100 for conducting an online progressive jackpot contest (or "contest" for brevity). In one embodiment, the environment 100 includes game servers 105, a plurality of client devices 110, and a contest server 115 coupled through a network 120 such as the internet.

Users (referred to variously as "players" and "contestants" depending upon the circumstances) play the games served by the game servers 105 via the client devices 110. The client devices 110 may be any devices having input/output and network access capabilities, such as desktop computers, laptop computers, tablets, or mobile phones. Although three exemplary clients 110 are illustrated in FIG. 1, hundreds or thousands of clients may be in communication with the game servers 105 and contest server 115 at a given time.

The game servers 105 serve one or more games to the one or more client devices 110. A game server 105 serves a game by generating and providing a user interface for the game for display on the client devices 110, managing gameplay of the game, and responding to user actions within the game. The game servers 105 may serve games of various types, including, for example, video slots, blackjack, roulette, and poker. Within each type of game, the game servers 105 may also serve several distinct games. For example, the game servers 105 may serve a holiday-themed slots game, a sports-themed slots game, and an outer space-themed slots game.

In each round of gameplay (e.g., each spin of a virtual slots machine or each hand of blackjack), players place bets on the outcome of the round. A bet may specify an amount of money, coins, points, or the like (collectively referred to herein as "coin-in"). By placing bets and playing rounds of the games, players gain the opportunity to collect winnings. Winnings may be, for example, an amount of money, a number of virtual coins, or a number of points. In each round of a game, a game server 105 determines a player's winnings in the round based on the player's bet and the outcome of the round. Depending on the type of the game, the outcome of a round may be random (e.g., the combination of symbols appearing on each line of a virtual slots machine, or the pocket a roulette ball falls into) or influenced by choices of the player in the round (e.g., the player's total card value at the end of a hand of blackjack).

For example, a video slots game served by a game server 105 has a pay table defining an amount of winnings paid out for each type of win, represented to the player as a winning combination of symbols on a virtual slot machine. A player may bet on a number of lines of the virtual slot machine, where the size of the bet increases in proportion to the number of lines the player bets on. After each spin of the virtual slots, the game server 105 determines the player's winnings for each line based on the combination of symbols appearing on the line and the pay table for the game. Pay tables may be different between games served by the game servers 105. That is, a first game may have a first pay table and a second game may have a second pay table, where the first pay table specifies different payouts for different game outcomes than those specified by the second pay table.

The game server 105 distributes the determined winnings to an account of the player. The gross winnings of a player within a period of time, such as a gaming session, are collectively referred to herein as the player's "score," regardless of whether the winnings are money, virtual coins, points, or other prizes. Moreover, a player's net amount of winnings in a round of gameplay may be positive (if the winnings are greater than the coin-in) or negative (if the winnings are less than the coin-in).

In one embodiment, the game servers 105 collectively serve games through or in association with a centralized portal in an online system, such as a social networking system 125. The social networking system 125 offers its users the ability to communicate and interact with other users. The social networking system 125 maintains a profile describing each of its users. Information stored in a user profile may include, for example, biographic information and actions taken by the users on pages related to the social networking system 125, such as users' actions in the games served by the game servers 105. In using the social networking system 125, users may add connections to a number of other users of the system. Connections in the system 125 may be unidirectional (e.g., user A connects to user B, but user B does not necessarily connect to user A) or bidirectional (e.g., users A and B are connected if both user A and user B authorize the connection).

The social networking system 125 (or other online system) allows users to view information about the games, access games to play, and manage their respective winnings. In one embodiment, the game servers 105 associate a player's winnings with an account or profile of the player in the online system and collect the player's winnings from the games served through the online system in a single rewards account for the player. Players may then add winnings to their centralized account by playing multiple different games, and may draw from the account to place bets in each of the games. The social networking system 125 also allows players to carry out real money transactions to purchase virtual credits. The game servers 105 may also contribute coins or points to a player's account responsive to the player's activities relating to the social networking system 125. Such activities may include, for example, inviting connections to play the games served by the game servers 105, sending game-related gifts (such as free coins or spins) to connections, or posting notifications about high winnings on a profile page of the player.

Players of the games may be divided into "levels" in the online system based on their gameplay. The game servers 105 or the online system may determine a player's level based on, for example, the player's total winnings, coin-in at each round of a game, the amount of time or number of rounds played, or other factors. By increasing their total amounts of winnings, playing more rounds of games, increasing their coin-in, or the like, players may be promoted to increasingly higher levels within the online system. Levels may be used as a sorting parameter in a contest to determine which players are selected as contestants in a particular contest, so that players who bet similarly or have a similar level of experience can be placed in a same contest.

The contest server 115 operates contests associated with the games served by the game servers 105. In each contest, players of the games compete to win a jackpot funded at a rate proportional to the players' winnings in the games from an account separate from the players' winnings. As such, contests provide players with an opportunity to win an extra reward for play beyond their winnings in the games. Contests are generally associated with, but external to, one or more games served by the game servers 105. That is, players may enter and advance within a contest based on their play in an associated game, but the contest does not affect payouts or results of the game. In other implementations, the games used in a contest may differ from their non-contest counterparts. They may differ in pay table, payouts, and actual game content.

Contests may run on a recurring basis for a fixed period of time, number of rounds, or other fixed play conditions. To operate contests, the contest server 115 designates one or more games as associated with a contest, funds the contest's jackpot, determines which players are eligible to enter the contest as contestants, carries out and tracks the contest including tracking leading contestants on a leader board, and identifies one or more winners of the contest. In one embodiment, the contest server 115 is remote from the game servers 105. However, the functions of the contest server 115 may also be performed by one or more of the game servers 105. Moreover, the environment 100 may include a plurality of contest servers 115, each operating one or more contests.

Communication between the game servers 105, client devices 110, and contest server 115 is enabled by network 120. In one embodiment, the network 120 uses standard communications technologies and/or protocols. Thus, the network 120 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 120 can also include links to other networks such as the Internet.

Contest Server

Figure 2:
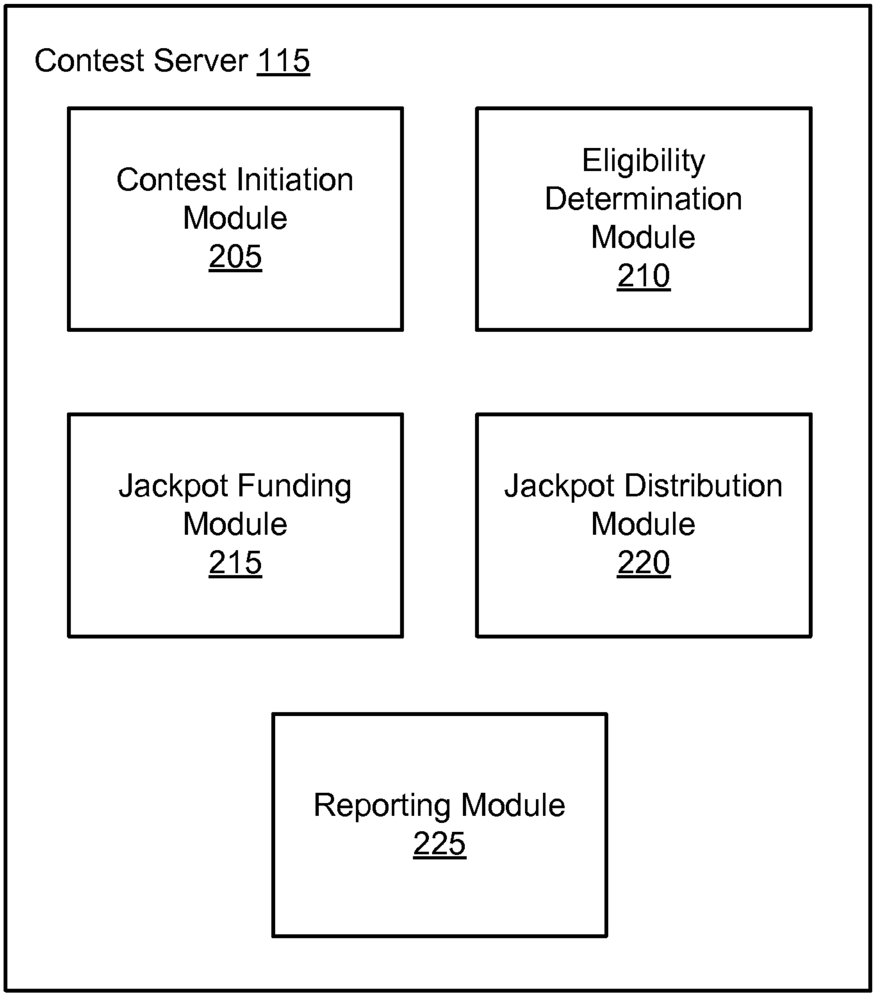
FIG. 2 is a block diagram illustrating modules within a contest server, according to one embodiment.

FIG. 2 is a block diagram illustrating modules within the contest server 115. In one embodiment, the contest server 115 comprises a contest initiation module 205, an eligibility determination module 210, a jackpot funding module 215, a jackpot distribution module 220, and a reporting module 225. Other embodiments of the contest server 115 may include fewer or additional modules, and the functions of the contest server 115 may be distributed differently between the modules. As will be apparent from the following descriptions, the operations and functions of the contest server 115 are sufficiently complex as to require their implementation by a computer system, and cannot be performed by mental steps in the human mind.

The contest initiation module 205 establishes parameters for each contest. Contest parameters may include one or more games associated with the contest, a start time, an ending condition (for example, an ending time or an ending score), and eligibility criteria defining how a player may become a contestant. In one embodiment, the contest initiation module 205 defines the contest parameters automatically by selecting arbitrary games to be associated with the contest, arbitrary start and stop times for the contest, and so forth. In another embodiment, the contest initiation module 205 receives contest parameters from an operator of the contest server 115. Contest parameters may be defined by the operator in advance of a contest, such as a week or month before the contest is scheduled to begin. The contest initiation module 205 or an operator of the contest server 115 may also establish contest parameters for many contests simultaneously by, for example, scheduling recurring contests. In one embodiment, the contest initiation module 205 determines contest parameters dynamically based on the time of day, number of players playing the games at a given time, average winnings of the players, player levels or other dynamic factors.

In establishing contest parameters, the contest initiation module 205 associates one or more of the games served by the game servers 105 with a particular contest. For example, the contest initiation module 205 may associate an outer space-themed slots game and a sports-themed slots game with a contest. The contest initiation module 205 may associate different types of games or games having different pay tables with a contest.

The contest initiation module 205 may specify start times for individual contests (e.g., 3 pm on March 14), or may specify recurring start times (e.g., a contest associated with a particular set of games will begin every hour, on the hour, on March 14). In another embodiment, the contest initiation module 205 may initiate a contest associated with a game when a threshold number of players are playing the game. Alternatively, the contest initiation module 205 may receive a contest start time manually entered by a user, such as an operator of the contest server 115, and designate the received time as the contest start time.

The contest initiation module 205 may also determine an ending condition for the contest, defining a time period over which the contest is to run (a "contest session"). In one embodiment, the ending condition is an end time. For example, the contest initiation module 205 may specify an end time relative to the contest start time (such as one hour after a contest begins), or may designate an absolute time (such as 4 pm on March 14) as the contest end time. In another embodiment, the contest initiation module 205 defines an ending score for the contest, such that the contest ends when one or more players achieve the ending score. In yet another embodiment, the contest initiation module 205 sets a maximum jackpot for the contest, such that the contest ends when the value of its jackpot reaches the maximum value. Moreover, a contest may have multiple ending conditions. For example, a contest may end when the first of a set of ending conditions has been met, or may end when two of three ending conditions have been fulfilled. The contest initiation module 205 may receive the contest ending conditions from an operator of the contest server 115, or may automatically generate the ending conditions.

Furthermore, the contest initiation module 205 may specify one or more contestant eligibility criteria for a contest. An eligibility criterion may be a threshold score that a player must win by playing an associated game in order to enter the contest. For example, an eligibility criterion may be winning three hundred coins in a game associated with the contest. In another embodiment, an eligibility criterion may be playing a game for a threshold length of time, such as five minutes. Other possible examples of eligibility criteria include the player's level, number of games played, an amount of coin-in by the player during a current gaming session, a rate of winning, and denominations of coins being played by the player. For example, the eligibility criteria for a particular contest may be winning 300 coins for players from levels 1-10, and winning 1000 coins for players from levels 11-20. Other contests may be open to players of an associated game regardless of the players' respective winnings or amount of time playing the game. Furthermore, the eligibility criteria may specify which games players can play to become eligible for a contest. The specified game may the game associated with the contest, or may be another game served by a game server 105. For example, a contest may specify that a player must play a first game to become eligible for a contest, and once the player is a contestant they must play a second game to earn winnings that contribute towards their score in the contest. The first and second games may vary significantly (e.g., blackjack versus poker) or they may be similar games (e.g., both slots games) that vary with respect to content (e.g., graphics), paytables, etc.

The eligibility determination module 210 determines which players are eligible to enter each contest, based on the contest's eligibility criteria. The eligibility determination module 210 receives notifications from the game servers 105 regarding players' activities in the one or more games associated with a contest, such as the players' winnings, time spent playing the games or number of rounds played, and/or coin-in. Based on the players' activities, known information about the player (e.g., player level) and the eligibility criteria of the contest, the eligibility determination module 210 identifies players eligible for entry into the contest. For example, if a contest's eligibility criterion is winning three hundred coins after the start time of a contest, the eligibility determination module 210 identifies which players have earned three hundred coins since the beginning of the contest. When a player's gameplay fulfills the eligibility criteria for the contest, the player can become a contestant in the contest. In one embodiment, the eligibility determination module 210 automatically enters players into a contest when they achieve the eligibility criteria for the contest, and notifies the eligible players that they have become contestants in the contest. Alternatively, the eligible players may be provided notification of their eligibility and given a choice whether to enter the contest (for example, via a dialogue box). For each contestant, the eligibility determination module 210 may send an identifier of the contestant to the jackpot distribution module 220 for tracking the contestant's winnings during the contest When a game is associated with a contest, gameplay of the game by a player who is a contestant in the contest contributes to the contest's jackpot. Contestants are also ranked in the contest based on their gameplay in the game(s) associated with a contest. In contrast, if a contestant play a game that is not associated with a given contest, their play of the game does not contribute to the jackpot of the contest and does not count towards the contestant's ranking in the contest.

Once the contest starts according to specified start criteria, the jackpot funding module 215 receives notifications from game servers 105 of contestants' winnings in the games associated with the contest. The jackpot funding module 215 funds a jackpot based on the winnings of the contestants, but without contribution from the winnings That is, player winnings are paid out from a first source, such as an account funded by contestants' coin-in, and the jackpot funding is drawn from a second source that is different from the first source. For example, funds for the progressive jackpot may be provided from existing operating cash, budgeted marketing dollars, third party or sponsor funding, or the like. Thus, contestants' winnings in a game are unaffected by the game being associated with a contest.

The jackpot funding module 215 may set an initial value for the jackpot to encourage players to enter the contest, and increase the value of the jackpot at a funding rate that may be a function of various internal or external factors. For example, the jackpot funding module 215 may fund the jackpot by the equation $J=J_0+aW$, where J is the total value of the jackpot, $J_0$ is the initial value of the jackpot defined by an operator of the contest server 115, W is the accumulated winnings of the contestants in the contest, and a is the funding rate of the jackpot (e.g., 1.5%). Internal factors that may influence the funding rate of the jackpot include the current amount of the jackpot, the number of contestants in the contest, the current rate of coin-in by the contestants, and the like. External factors include factors that are independent of the particular players or games, such as time of day, day of week, season, or advertising campaigns in the online system. In one embodiment, multiple different funding rates can be combined in a given contest. As a jackpot is funded, the jackpot funding module 215 may display the current jackpot amount to players of the games, enticing players to enter a contest or to continue playing the games associated with the contest to increase their chances of winning the jackpot.

At the conclusion of the contest, the jackpot distribution module 220 determines which contestants, if any, win the jackpot associated with each contest. During a contest session, the jackpot distribution module 220 receives contestants' activities from the game servers 105 and ranks the players in the contest according to their winnings in the associated games, their coin-in during the contest, their level, or other factors. The jackpot distribution module 220 may rank contestants in a variety of manners. In one embodiment, rankings may be based directly on contestants' scores relative to a baseline. For example, if Player A wins 600 coins above the baseline and Player B wins 20 coins above the baseline, Player A earns a higher rank than Player B. The baseline score may be a fixed value (such as zero) across the set of contestants in a contest, or may be determined based on each contestant's score, gross winnings, or level at the start of a contest. For example, a baseline score may be the score of each player when the player became eligible for the contest.

In another embodiment, the contestants may earn points based on ranges of the coins they win (such as one point for every 100 coins won), and the jackpot distribution module 220 may rank the contestants based on their points. For example, if Player A wins 190 coins and Player B earns 100 coins, Player A and Player B each earns one point. Thus, Player A and Player B may be tied in the rankings determined by the jackpot distribution module 220. In yet another embodiment, contestants' scores in each round of play are normalized to their respective coin-ins for the round. For example, Player A bets 300 coins in a given round and wins 600 coins, receiving a normalized score of 600/300=2. Similarly, Player B bets 10 coins and wins 20 coins, and therefore receives the same normalized score of 2 and the same rank as Player A, even though Player A earned 580 more coins than Player B.

In yet another embodiment, the contestants may be ranked based on the amount of time or number of rounds of play they take to reach a point target. For example, given a point target of 100 points, the first contestant to win 100 points within a given time period achieves the highest rank, the second contestant achieves the next highest rank, and so forth.

At the end of a contest, the jackpot distribution module 220 distributes prizes to one or more contestants in each contest based on the rankings. The jackpot distribution module 220 may award the jackpot (or a portion of the jackpot) to the top N ranked contestants when a contest's ending condition has been met. For example, if the contest's ending condition is an end time, the jackpot distribution module 220 may award prizes to the top N contestants at the contest end time. As another example, if a contest's ending condition is a target score, the jackpot distribution module 220 may award prizes to the first N contestants to reach the target score. The number of contestants N who are determined to be winners of the jackpot may be a fixed value, or may depend on the total number of contestants in the contest, the size of the jackpot, or other factors. For example, the jackpot distribution module 220 may designate the top 10% of contestants in a contest as winners. As another example, the jackpot distribution module 220 may divide the jackpot, having total value J, into portions of fixed value x, and select N=J/x ranked contestants as winners of the corresponding portions of the jackpot (rounding N down to the nearest integer if x does not evenly divide J).

The jackpot distribution module 220 may award prizes of different sizes, amounts, or values to the contestants determined to be winners, if there are multiple winners. For example, the jackpot distribution module 220 may award prizes of linearly or exponentially decreasing values, in which higher ranked contestants receive prizes of greater size, amount, or value than lower ranked contestants.

The reporting module 225 reports information about the progression of a contest to players. In one embodiment, as a jackpot associated with a contest is funded, the reporting module 225 displays the current jackpot amount to players of the games served by the game servers 105, enticing players to enter the contest or to continue playing the games associated with the contest to increase their chances of winning the jackpot. The reporting module 225 may also display contestants' current winnings, rank among the contestants, rate of winnings during a recent period of time, and the like. For example, the reporting module 225 may generate a real-time leader board that indicates the current rankings of contestants in a given contest, encouraging the contestants to continue playing the associated games or to place higher bets for the chance to achieve a higher rank.

Operating Contests

Figure 3:
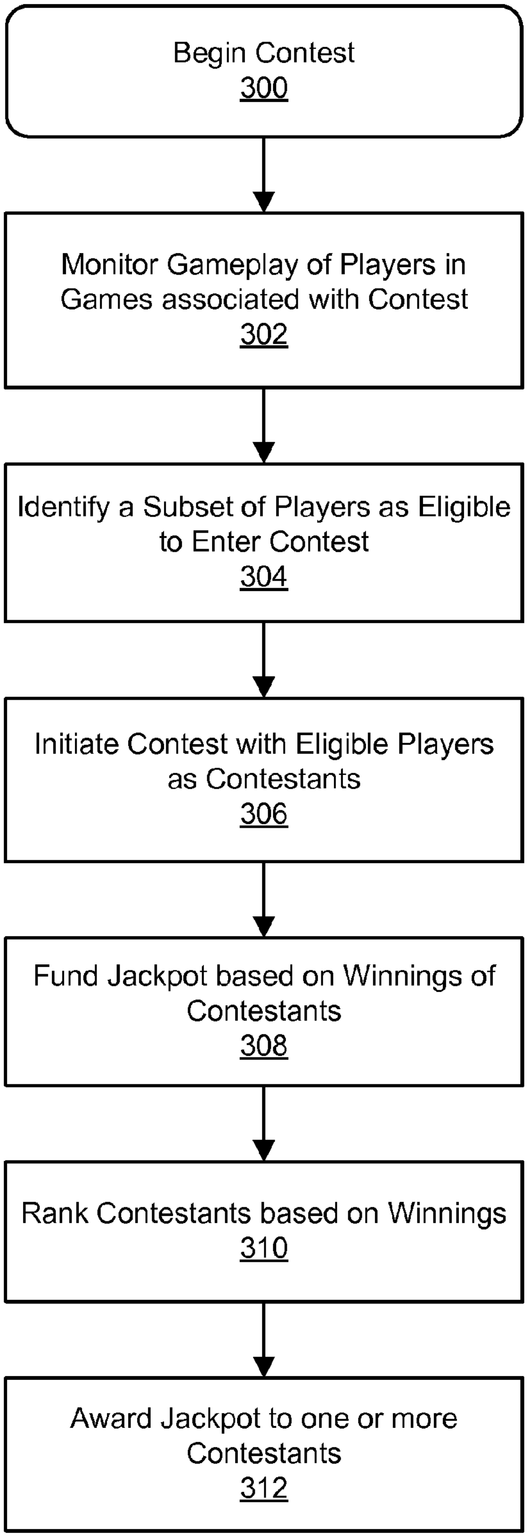
FIG. 3 is a flowchart illustrating a process for conducting an online progressive jackpot contest, according to one embodiment.

FIG. 3 is a flowchart illustrating a method for operating a contest associated with online games. In one embodiment, the steps of the process are performed by the contest server 115. Other embodiments perform the illustrated steps in different orders, and/or perform different or additional steps. Moreover, some of the steps may be performed by entities other than the contest server 115, such as one or more game servers 105.

Figure 4:
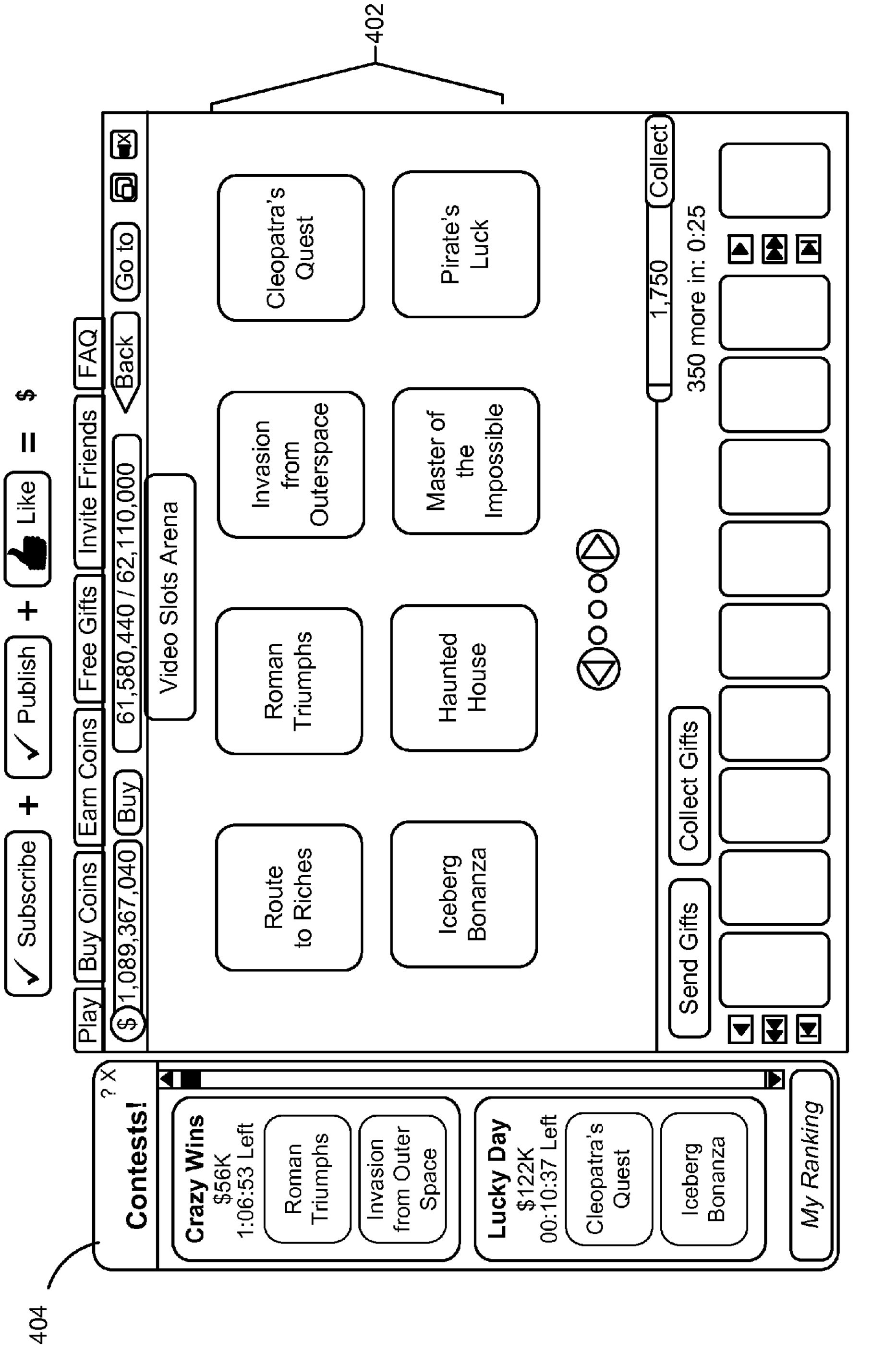
FIG. 4 is a screenshot illustrating a video slots portal, according to one embodiment.

Players may play the games served by the game server 105, where rounds of the games begin and end at various times. For example, FIG. 4 is a screenshot illustrating a video slots portal of a social networking system 125, through which users can select and play various video slots games 402. At a preselected time, the contest server 115 begins 300 a contest associated with one or more games. Players in the online system may receive notification that a contest has begun. A contests panel 404 indicates contests currently in progress, including games associated with the contest, the number of players, current jackpot, and time remaining. Any number of contests may be operated contemporaneously. Players can select a particular contest to enter by, for example, selecting the contest from the panel 404, or can select a game to play from the set of video slots games 402. Contest sessions may overlap with zero, one, or more gaming sessions of a player. For example, a player may begin playing a game at 5 pm. At 5:30 pm, the contest server 115 begins 300 an hour-long contest associated with the game. At 5:45 pm, the player stops playing the game, but returns at 6:15 pm to play until 6:45 pm. In this example, the player's two gaming sessions (from 5:00 pm to 5:45 pm, and from 6:15 pm to 6:45 pm) overlap with a single contest session (from 5:30 to 6:30). Similarly, multiple contest sessions may overlap with a single gaming session of a player. Furthermore, players may play games associated with multiple contests during a single gaming session. Players may alternatively play games not associated with a contest, betting and winning in the games without contributing to a jackpot and without earning the opportunity to win a jackpot.

Returning to FIG. 3, the contest server 115 monitors 302 gameplay of players in the games associated with a contest during the contest session. Based on the players' activities and one or more eligibility criteria of the contest, the contest server 115 identifies 304 a subset of the players as eligible to enter to the contest. The contest server 115 may identify 304 eligible players at any time or even multiple times during the contest. Thus, players may be continually becoming eligible for a contest throughout the duration of the contest. In the example of FIG. 3, the contest server 115 initiates 306 the contest once the players become eligible to be contestants in the contest.

Figure 5:
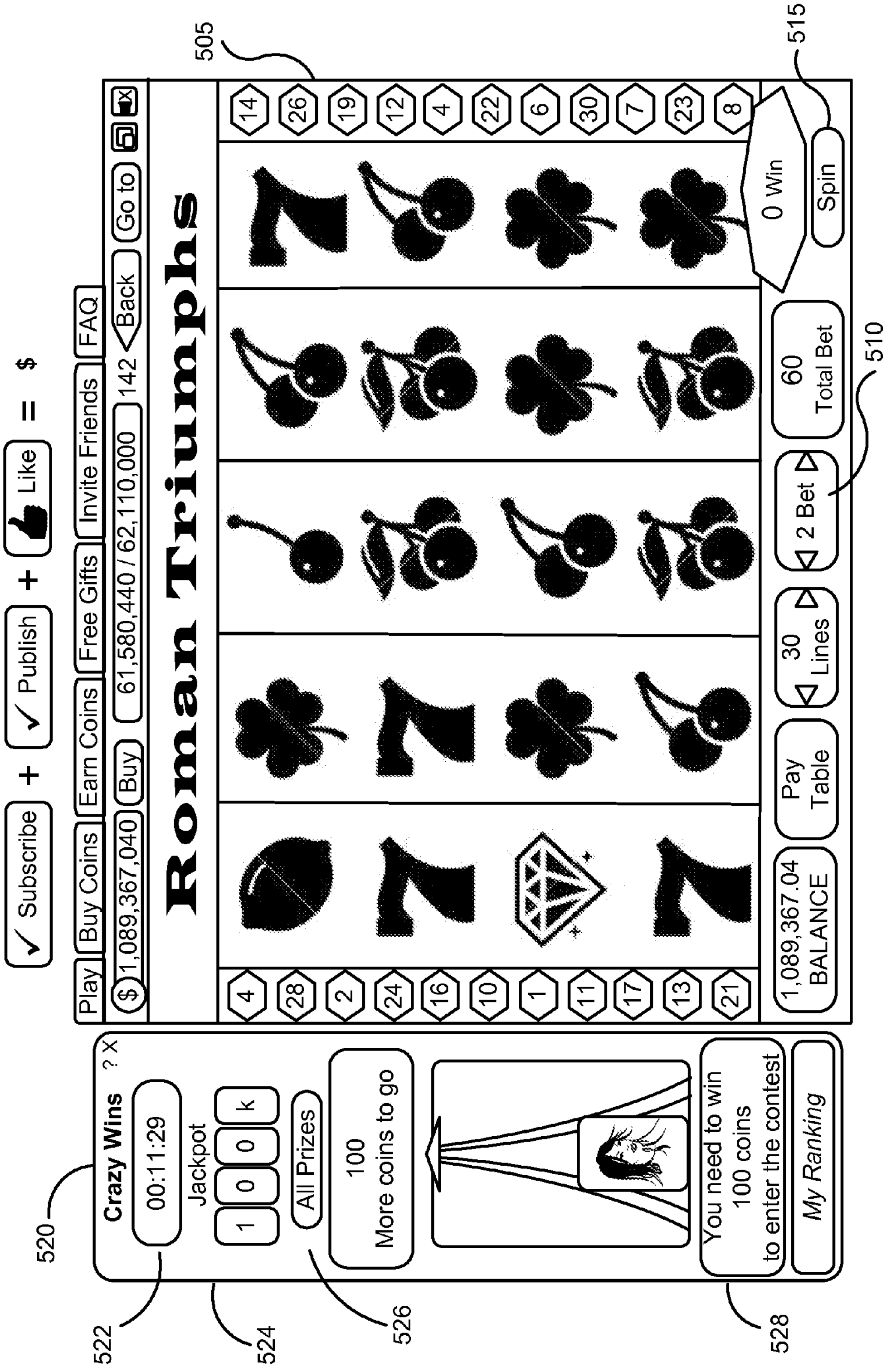
FIG. 5 is a screenshot illustrating a video slots game and associated contest panel, according to one embodiment.

For example, FIG. 5 is a screenshot illustrating a video slots game 505, for example selected from the set of video slots games 402, displayed to a player by the game server 105. The player may place a bet for each round by selecting a per-payline bet value 510, and may spin the virtual slot machine by selecting the "Spin" button 515. As the player plays the game 505, the game server 105 calculates the player's winnings in each round and sends the player's activities to the contest server 115. As illustrated in FIG. 5, the video slots game 505 is associated with a currently-running contest, and a contest panel 520 displays information about the contest to the player. For example, the contest panel 520 displays a countdown timer 522, showing the amount of time remaining in the current contest, and a jackpot counter 524, showing the current size of the jackpot associated with the contest. Players of the game 505 may also select the "All Prizes" menu 526 to view information about the current number of players who will win prizes, and the corresponding prizes for the top-ranked players. Until a user has become eligible to enter the contest, the contest panel 520 may also display an eligibility criterion 528 and/or the users' progress towards meeting the eligibility criterion. For example, the eligibility criterion 528 illustrated in FIG. 5 indicates that the player will be eligible to enter the current contest when the user wins 100 coins in the slots game 505. When the player wins 100 coins, the contest server 115 may identify 304 that the player is eligible to enter the contest, and initiate 306 the contest with the eligible player as a contestant.

Figure 6:
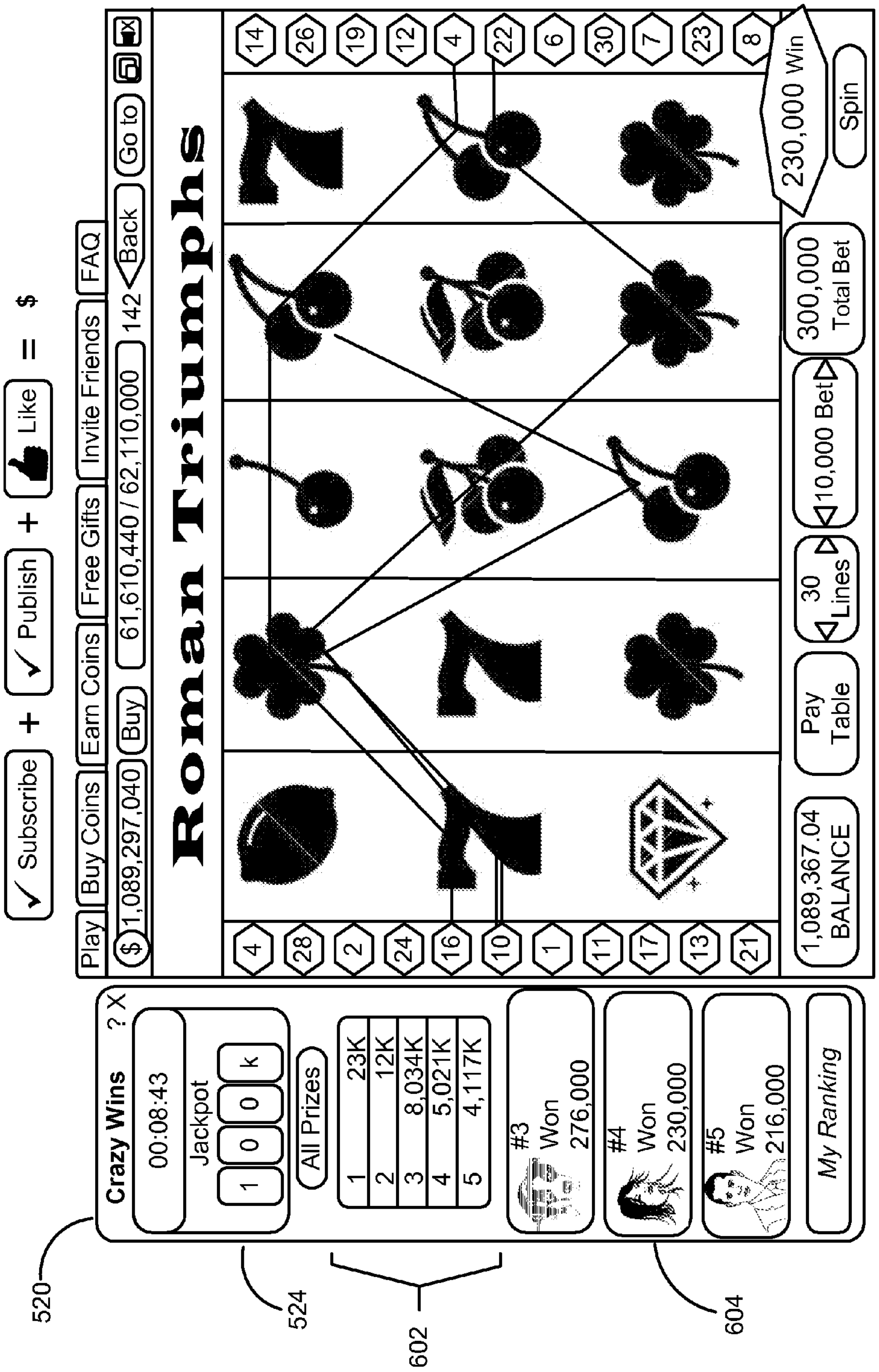
FIG. 6 is a screenshot illustrating a real-time leader board within a contest panel, according to one embodiment.

Returning to FIG. 3, the contest server 115 funds 308 a jackpot and ranks 310 the eligible players based on winnings of the contestants in the games associated with a contest during a contest session. The contest server 115 may notify players of the current jackpot amount, the number of players who will win portions of the jackpot and sizes of the portions, and a real-time leader board of contestant rankings. For example, FIG. 6 is a screenshot of the contest panel 520 during a contest, illustrating current prizes 602 and real-time rankings 604. The prizes 602 represent portions of the jackpot 524 to be distributed to each top-ranked contestant at the end of a contest. By displaying the real-time leader board 604 to contestants in a contest, a contestant may receive regular updates as to the contestant's current rank in the contest. Contestants may also determine from the rankings how many coins the user must win to reach a top-ranked position, as well as the prize to be awarded when the user reaches the top-ranked positions. By regularly updating contestants with this information, the contestants may be motivated to place larger bets or continue playing the games in order to reach a winning rank.

Returning again to FIG. 3, the contest server 115 continually receives contestants' activities and ranks the contestants until a predefined contest ending condition is fulfilled. At the time the ending condition is fulfilled, the contest server 115 determines which contestants currently have the highest ranks in the contest, and awards 312 the jackpot (or portions of the jackpot) to the highest-ranked contestants. Contestants may continue playing the games after a jackpot has been awarded and, when a next contest associated with the games begins, the contestants may become eligible to enter the next contest based on their continued winnings. The process illustrated in FIG. 3 may be repeated indefinitely for any number contests served by the contest server 115.

Additional Considerations

In this description, the term "module" refers to computational logic for providing the specified functionality. A module can be implemented in hardware, firmware, and/or software. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the contest server 115, loaded into memory, and executed by the one or more processors of the service's computers.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

As used herein any reference to “one embodiment” or “an embodiment” means that a particular element, feature, structure, or characteristic described in connection with the embodiment is included in at least one embodiment. The appearances of the phrase “in one embodiment” in various places in the specification are not necessarily all referring to the same embodiment.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the “a” or “an” are employed to describe elements and components of the embodiments herein. This is done merely for convenience and to give a general sense of the invention. This description should be read to include one or at least one and the singular also includes the plural unless it is obvious that it is meant otherwise.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. In particular, many variations and specific design choices can be made to the specific embodiments of the independent progressive jackpots system described herein without departing from the inventive concepts. It is therefore intended that the scope of the invention be limited not by this detailed description, but rather by the claims appended hereto.

What is claimed is:

1. A method for operating a contest server in conjunction with a plurality of client devices, the method comprising:

receiving, by the contest server, from the plurality of client devices as bets, credits drawn from accounts of a plurality of players for initiating a plurality of games, wherein each game having a game type, the game type being one of a plurality of different game types, wherein the accounts of the plurality of players are stored by an online system and include credits purchased by the plurality of players via real money transactions;

initiating, by the contest server, the plurality of games accessible to the plurality of client devices of the plurality of players in response to the bets received from the plurality of players;

monitoring, by the contest server, game play of the plurality of client devices of the plurality of players with respect to the plurality of games;

identifying, by the contest server, a subset of the plurality of players as eligible to enter a contest based on one or more eligibility criteria comprising a threshold for an amount of winnings of a player during the monitored game play of the plurality of games;

initiating, by the contest server, the contest with a plurality of the eligible players as contestants according to contest criteria, the contest criteria specifying a subset of the plurality of games to be associated with the contest, wherein associated games include a plurality of the different game types;

monitoring, by the contest server, game play of the plurality of client devices of the contestants with respect to the associated games, the monitoring comprising determining an amount of contest winnings for each contestant, wherein the amount of contest winnings is paid out from a first source and stored in an account of the contestant, wherein the amount of contest winnings comprises winnings from games of the plurality of different game types;

funding, by the contest server, a jackpot for the contest from a second source different from the first source at a rate proportional to the amounts of contest winnings of the contestants in games associated with the contest, wherein the second source is independent of a contestants' coin-in and winnings in the plurality of games associated with the contest;

ranking, by the contest server, the contestants based on the amount of contest winnings of each contestant;

distributing, by the contest server, the amount of contest winnings for each contestant as credits to their respective accounts stored by the online system; and distributing, by the contest server, portions of the jackpot as credits to the respective accounts of one or more of the contestants based on the ranking of the contestants.

2. The method of claim 1, wherein the one or more eligibility criteria further comprise a threshold score, and wherein identifying by the contest server the subset of the plurality of players as eligible to enter the contest comprises:

responsive to a player having an amount of winnings in the plurality of games during the monitored game play that exceeds the threshold score, identifying the player as eligible to enter the contest.

3. The method of claim 1, wherein the one or more eligibility criteria further comprise a threshold time, and wherein identifying by the contest server the subset of the plurality of players as eligible to enter the contest comprises:

responsive to a player playing the plurality of games during the monitored game play for the threshold time, identifying the player as eligible to enter the contest.

4. The method of claim 1, wherein ranking by the contest server the contestants comprises:

establishing a baseline amount of winnings;

determining a difference between a current amount of winnings of each player and the baseline amount of winnings; and ranking the plurality of players based on the determined difference.

5. The method of claim 1, further comprising:

displaying by the contest server the ranking of the contestants on a real-time leader board.

6. The method of claim 1, wherein monitoring by the contest server the game play of the plurality of players with respect to the plurality of games comprises:

monitoring respective amounts of winnings of the players in the plurality of games.

7. A non-transitory computer-readable storage medium storing computer program instructions for operating a contest server in conjunction with a plurality of games, the computer program instructions executable to perform steps comprising:

receiving, by the contest server, from the plurality of client devices as bets, credits drawn from accounts of a plurality of players for initiating a plurality of games, wherein each game having a game type, the game type being one of a plurality of different game types, wherein the accounts of the plurality of players are stored by an online system and include credits purchased by the plurality of players via real money transactions;

initiating, by the contest server, the plurality of games accessible to the plurality of client devices of the plurality of players in response to the bets received from the plurality of players;

monitoring, by the contest server, game play of the plurality of client devices of the plurality of players with respect to the plurality of games;

identifying, by the contest server, a subset of the plurality of players as eligible to enter a contest based on one or more eligibility criteria comprising a threshold for an amount of winnings of a player during the monitored game play of the plurality of games;

initiating, by the contest server, the contest with a plurality of the eligible players as contestants according to contest criteria, the contest criteria specifying a subset of the plurality of games to be associated with the contest, wherein the associated games include a plurality of the different game types;

monitoring, by the contest server, game play of the plurality of client devices of the of the contestants with respect to the associated games, the monitoring comprising determining an amount of contest winnings for each contestant, wherein the amount of contest winnings is paid out from a first source and stored in an account of the contestant, wherein the amount of contest winnings comprises winnings from games of the plurality of different game types;

funding, by the contest server, a jackpot for the contest from a second source different from the first source at a rate proportional to the amounts of contest winnings of the contestants in games associated with the contest, wherein the second source is independent of a contestants' coin-in and winnings in the plurality of games associated with the contest;

ranking, by the contest server, the contestants based on the amount of contest winnings of each contestant;

distributing, by the contest server, the amount of contest winnings for each contestant as credits to their respective accounts stored by the online system; and distributing, by the contest server, portions of the jackpot as credits to the respective accounts of one or more of the contestants based on the ranking of the contestants.

8. The non-transitory computer-readable storage medium of claim 7, wherein the one or more eligibility criteria further comprise a threshold score, and wherein identifying by the contest server the subset of the plurality of players as eligible to enter the contest comprises:

responsive to a player having an amount of winnings in the plurality of games that exceeds the threshold score, identifying the player as eligible to enter the contest.

9. The non-transitory computer-readable storage medium of claim 7, wherein the one or more eligibility criteria further comprise a threshold time, and wherein identifying by the contest server the subset of the plurality of players as eligible to enter the contest comprises:

responsive to a player playing the plurality of games for the threshold time, identifying the player as eligible to enter the contest.

10. The non-transitory computer-readable storage medium of claim 7, wherein ranking by the contest server the contestants comprises:

establishing a baseline amount of winnings;

determining a difference between a current amount of winnings of each player and the baseline amount of winnings; and ranking the plurality of players based on the determined difference.

11. The non-transitory computer-readable storage medium of claim 7, the computer program instructions further executable to perform steps comprising:

displaying by the contest server the ranking of the contestants on a real-time leader board.

12. A contest server system for operating a contest associated with a plurality of games, the system comprising:

a betting module for receiving, as bets, credits drawn from accounts of a plurality of players for initiating the plurality of games, wherein each game having a game type, the game type being one of a plurality of different game types, wherein the accounts of the plurality of players are stored by an online system and include credits purchased by the plurality of players via real money transactions and initiating the plurality of games in response to the bets received from the plurality of players;

an eligibility determination module for:

monitoring game play of the plurality of players with respect to the plurality of games; and identifying a subset of the plurality of players as eligible to enter a contest based on one or more eligibility criteria comprising a threshold for an amount of winnings of a player during monitored game play;

a contest initiation module for initiating the contest with a plurality of eligible players as contestants according to contest criteria, the contest criteria specifying a subset of the plurality of games to be associated with the contest and, wherein associated games include a plurality of different game types;

a jackpot funding module for:

monitoring game play of the contestants with respect to the associated games, the monitoring comprising determining an amount of contest winnings for each contestant, wherein the amount of contest winnings is paid out from a first source and stored in an account of the contestant, wherein the amount of contest winnings comprises winnings from games of the plurality of different game types; and funding a jackpot for the contest from a second source different from the first source at a rate proportional to the amounts of contest winnings of the contestants in games associated with the contest, wherein the second source is independent of a contestants' coin-in and winnings in the plurality of games associated with the contest;

a jackpot distribution module for:

ranking the contestants based on the amount of contest winnings of each contestant;

distributing the amount of contest winnings for each contestant as credits to their respective accounts stored by the online system; and distributing portions of the jackpot as credits to the respective accounts of one or more of the contestants based on the ranking of the contestants.

13. The system of claim 12, wherein the eligibility criteria further comprise a threshold score, and wherein the eligibility determination module identifying the subset of the plurality of players as eligible to enter the contest further comprises:

responsive to a player having an amount of winnings in the plurality of games that exceeds the threshold score, identifying the player as eligible to enter the contest.

14. The system of claim 12, wherein the eligibility criteria further comprise a threshold time, and wherein the eligibility determination module identifying the subset of the plurality of players as eligible to enter the contest further comprises:

responsive to a player playing the plurality of games for the threshold time, identifying the player as eligible to enter the contest.

15. The system of claim 12, wherein the jackpot distribution module ranking the eligible players further comprises:

establishing a baseline score;

determining a difference between a current amount of winnings of each player and the baseline amount of winnings; and ranking the players based on the determined difference.

16. The system of claim 12, wherein the jackpot distribution module displays the ranking of the contestants on a real-time leader board.

* * * * *